United States Patent
Sarkar et al.

(10) Patent No.: US 10,667,141 B2
(45) Date of Patent: May 26, 2020

(54) DETERMINATION OF FIFTH GENERATION MILLIMETER WAVE CUSTOMER PREMISES EQUIPMENT ANTENNA LOCATION FOR FIXED WIRELESS ACCESS SYSTEMS

(71) Applicant: Telefonaktiebolaget LM Ericsson (publ), Stockholm (SE)

(72) Inventors: Debasish Sarkar, Frisco, TX (US); Svemir Polchert, Murphy, TX (US); Ayan Sen, Bangalore (IN); Shikha Singh, New Delhi (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/146,307

(22) Filed: Sep. 28, 2018

(65) Prior Publication Data

US 2019/0268780 A1    Aug. 29, 2019

Related U.S. Application Data

(60) Provisional application No. 62/634,491, filed on Feb. 23, 2018.

(51) Int. Cl.
*H04W 16/18* (2009.01)
*H04B 17/318* (2015.01)
(Continued)

(52) U.S. Cl.
CPC .......... *H04W 16/18* (2013.01); *H04B 17/318* (2015.01); *H04B 17/336* (2015.01); *H04W 24/02* (2013.01)

(58) Field of Classification Search
CPC .... H04W 16/18; H04W 24/02; H04B 17/318; H04B 17/336
(Continued)

(56) References Cited

U.S. PATENT DOCUMENTS 6,317,599 B1 * 11/2001 Rappaport .......... G01F 23/0061
455/424
7,035,643 B2 * 4/2006 Slawitschka .......... H04W 16/18
455/422.1
(Continued)

FOREIGN PATENT DOCUMENTS

WO    2017/039521 A1    3/2017

OTHER PUBLICATIONS

International Search Report and Written Opinion of the International Searching Authority dated Jun. 5, 2019 issued in PCT Application No. PCT/IB2019/051221, consisting of 18 pages.

*Primary Examiner* — William Nealon
(74) *Attorney, Agent, or Firm* — Christopher & Weisberg, P.A.

(57) ABSTRACT

A method, system and computer for determining placement of at least one antenna of customer premises equipment in a fixed wireless access network are disclosed. According to one aspect, a method includes generating a map of signal strength for each of a plurality of possible antenna locations among one or more buildings. The method further includes identifying a percentage of a building having a level of wireless network coverage. The method also includes identifying a location of an antenna based on the map of signal strength and the identified percentage.

15 Claims, 13 Drawing Sheets

(51) Int. Cl.
  *H04W 24/02* (2009.01)
  *H04B 17/336* (2015.01)
(58) Field of Classification Search
  USPC .......................................................... 455/466
  See application file for complete search history.

(56) References Cited

U.S. PATENT DOCUMENTS

| | | | | |
|---|---|---|---|---|
| 8,620,301 | B1* | 12/2013 | Hessel | H04W 16/18 455/423 |
| 2004/0229623 | A1 | 11/2004 | Rappaport et al. | |
| 2004/0259555 | A1* | 12/2004 | Rappaport | H04W 16/18 455/446 |
| 2007/0066317 | A1* | 3/2007 | Amft | H04W 16/18 455/446 |
| 2013/0183961 | A1* | 7/2013 | Bassiri | H04W 16/20 455/423 |
| 2016/0353302 | A1 | 12/2016 | Gunnarsson et al. | |

\* cited by examiner

DETERMINATION OF FIFTH GENERATION MILLIMETER WAVE CUSTOMER PREMISES EQUIPMENT ANTENNA LOCATION FOR FIXED WIRELESS ACCESS SYSTEMS

CROSS-REFERENCE TO RELATED APPLICATION

This application is related to and claims priority to U.S. Provisional Patent Application No. 62/634,491, entitled "DETERMINATION OF FIFTH GENERATION MILLIMETER WAVE CUSTOMER PREMISES EQUIPMENT ANTENNA LOCATION FOR FIXED WIRELESS ACCESS SYSTEMS," filed Feb. 23, 2018, the entire contents of which is incorporated herein by reference.

FIELD

The present disclosure relates to wireless communications, and in particular, to determination of fifth generation (5G) millimeter wave (mmW) customer premises equipment (CPE) antenna location for fixed wireless access (FWA) systems.

Introduction

In today's progressing market for wider reachability of Mobile Broadband Services, the fifth generation (5G), also referred to as New Radio (NR), is destined to become a major enabler to achieve this sustainable development goal. Fixed Wireless Access (FWA) is emerging as a technology to provide enhanced mobile broadband. FWA using 5G technology assures both fiber-like performance and easy scalability to deliver gigabits of speed. With 5G set to provide 10 to 100 times more capacity than 4G, it has the potential to enable cost-efficient FWA solutions on a massive scale. This has a very good synergy with the existing Fiber to The Home (FTTH) solution where existing fiber points of presence can be well utilized to provide backhaul for 5G, which provides the last mile connectivity for the FWA. However, the success of FWA rests on a very dynamic planning mechanism since 5G using millimeter wave (mmW) radio faces significant propagation challenges.

One of the most predominant use cases for very high data rate offered by 5G is FWA where the challenges of last mile fiber to home can be easily overcome using 5G radio access. An end user needs to use a 5G Modem and a gateway (together collectively referred to as Customer Premises Equipment or CPE) connected to an external antenna.

This essentially translates to a detailed planning process which includes, but is not limited to, the steps of planning (block S40), considering capacity (block S42) and coverage (block S44) as shown in FIG. 1.

Millimeter wave (mmW) propagation (such as, for example, 28 GHz or 39 GHz) is quite challenging because of the high propagation losses due to Vegetation line of sight (vLOS) and non line of sight (nLOS) that introduces further complexity into the system. Moreover, mmW propagation requires careful selection of CPE antenna location to achieve optimal performance. Since an FWA subscriber requires a CPE antenna, proper positioning of the antenna will determine the throughput that can be achieved. Different dwelling units such as single family unit (SFU), multi-dwelling unit (MDU) and enterprise will have different philosophies for identifying CPE antenna location. All of these present a serious challenge to network planners and designers to identify and classify dwelling units into the right category, determine the number of households per building and finally identify the most suitable CPE antenna location. At present, there are no solutions available which can accurately and dynamically plan the CPE location based on planned coverage, making it difficult for radio access network (RAN) designers to come up with an optimal design which satisfies both coverage, capacity and quality requirements

SUMMARY

Some embodiments advantageously provide a method, system and apparatus for determining placement of at least one antenna of customer premises equipment in a fixed wireless access network. According to one aspect, a method includes generating a map of signal strength for each of a plurality of possible antenna locations among one or more buildings. The method further includes identifying a percentage of a building having a level of wireless network coverage. The method also includes identifying a location of an antenna based on the map of signal strength and the identified percentage.

Some embodiments include a method for determining placement of at least one antenna of customer premises equipment in a fixed wireless access network. The method includes generating a map of signal strength for each of a plurality of possible antenna locations among one or more buildings. The method also includes identifying a percentage of a building having a level of wireless network coverage, and determining a location of an antenna for placement based on the map of signal strength and the identified percentage.

According to this aspect, in some embodiments, the level of wireless network coverage is one of a downlink throughput threshold and a signal to interference plus noise ratio, SINR, threshold. In some embodiments, the identifying of a percentage of a building having a level of wireless network coverage includes estimating segments of the building which receive wireless network coverage. In some embodiments, the identifying of a percentage of a building having a level of wireless network coverage includes calculating a ratio of a length of covered segments to a perimeter of the building. In some embodiments, the method further includes classifying a building as one of a single dwelling and a multiple dwelling, the determining of the location of an antenna for placement being affected by whether the building is one of the single dwelling and the multiple dwelling. In some embodiments, the method also includes, when a building is classified as a multiple dwelling, calculating a number of floors of the building and a number of dwellings per floor, the determining of the location of an antenna for placement being affected by a number of floors of the building. In some embodiments, a distribution of antennas among dwellings of one floor of the building determine a distribution of antennas on at least one other floor of the building. In some embodiments, a number of dwellings is derived based on a perimeter of the building and a probability of non-livable space within the building.

According to another aspect, a computer for determining placement of at least one antenna of customer premises equipment in a fixed wireless access network is provided. The computer includes processing circuitry configured to: generate a map of signal strength for each of a plurality of possible antenna locations among one or more buildings, identify a percentage of a building having a level of wireless network coverage, and determine a location of an antenna for placement based on the map of signal strength and the identified percentage.

According to this aspect, in some embodiments, the level of wireless network coverage is one of a downlink throughput threshold and a signal to interference plus noise ratio, SINR, threshold. In some embodiments, the identifying of a percentage of a building having a level of wireless network coverage includes estimating segments of the building which receive wireless network coverage. In some embodiments, the identifying of a percentage of a building having a level of wireless network coverage includes calculating a ratio of a length of covered segments to a perimeter of the building. In some embodiments, the processing circuitry is further configured to classify a building as one of a single dwelling and a multiple dwelling, the determining of the location of an antenna for placement being affected by whether the building is one of a single dwelling and a multiple dwelling. In some embodiments, when a building is classified as a multiple dwelling, calculating a number of floors of the building and a number of dwellings per floor, the determining of the location of an antenna for placement being affected by a number of floors of the building. In some embodiments, a distribution of antennas among dwellings of one floor of the building determine a distribution of antennas on at least one other floor of the building. In some embodiments, a number of dwellings is derived based on a perimeter of the building and a probability of non-livable space within the building.

According to yet another aspect, a method for determining placement of at least one antenna of customer premises equipment in a fixed wireless access network is provided. The method includes generating a map of signal strength for each of a plurality of possible antenna locations among one or more buildings. The method also includes identifying a percentage of a building having a level of wireless network coverage, the level of wireless network coverage being one of a downlink throughput threshold and a signal to interference plus noise ratio, SINR, threshold, the identifying of a percentage of a building having a level of wireless network coverage including estimating segments of the building which receive wireless network coverage. The method further includes determining a location of an antenna for placement based on the map of signal strength and the identified percentage.

According to this aspect, in some embodiments, the identifying of a percentage of a building having a level of wireless network coverage includes calculating a ratio of a length of covered segments to a perimeter of the building. In some embodiments, the method also includes classifying a building as one of a single dwelling and a multiple dwelling, the determining of the location of an antenna for placement being affected by whether the building is one of a single dwelling and a multiple dwelling. In some embodiments, the method also includes using a tuned propagation model to generate a throughput plot for downlink and uplink signaling that satisfies a minimum coverage requirement for each distinct antenna placemen, the throughput plot being generated with a bin resolution on the order of meters.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
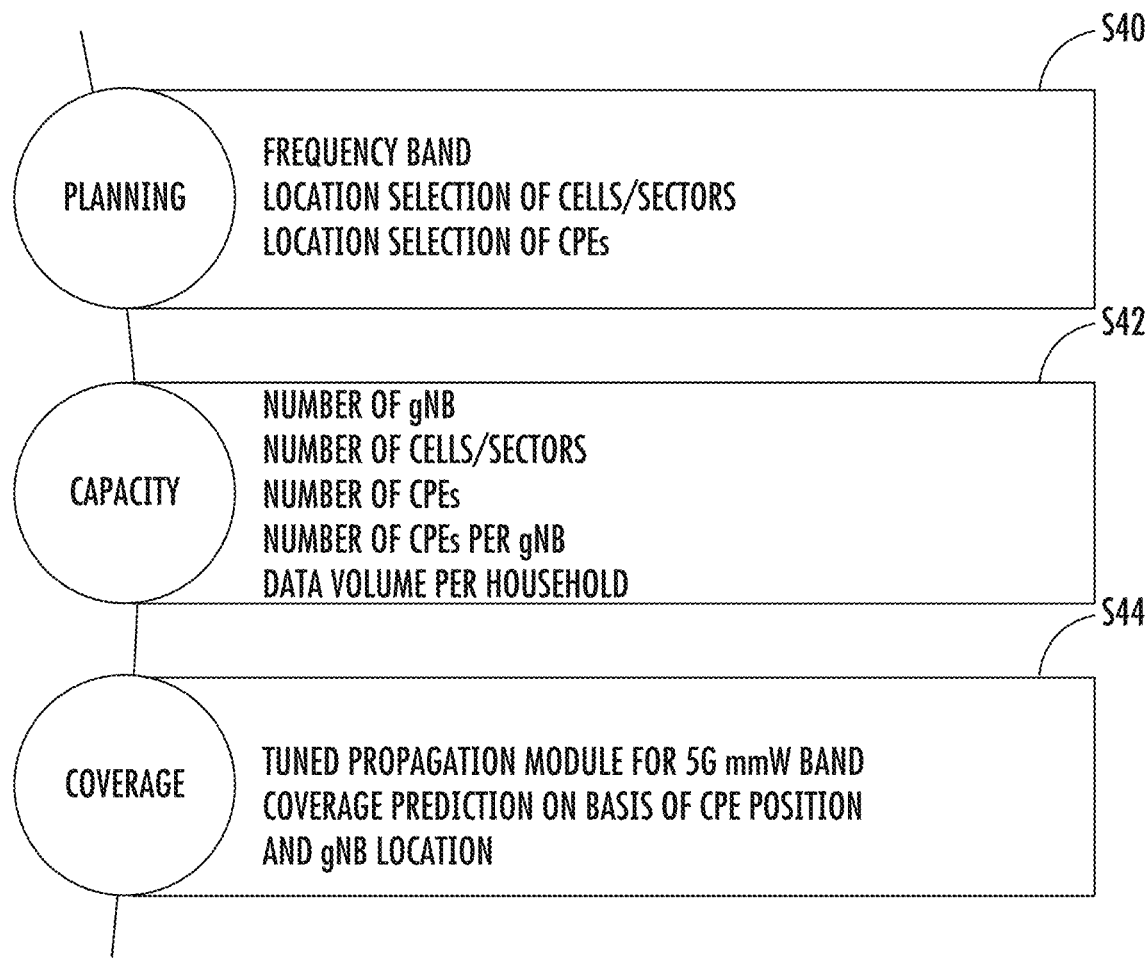
FIG. 1 depicts planning steps for CPE location.

Before describing in detail exemplary embodiments, it is noted that the embodiments reside primarily in combinations of apparatus components and processing steps related to determination of fifth generation (5G) millimeter wave (mmW) customer premises equipment (CPE) antenna location for fixed wireless access (FWA) systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, the term millimeter wave (mmW) is not limited to a particular frequency band/range and can include centimeter (cm) and other sized waves. In other words, mmW as used in the context of this disclosure can refer to frequencies that may include 24 GHz (as a non-limiting example) or higher frequencies, depending on implementation requirements.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are directed to an automated and intelligent FWA planning mechanism where the most suitable CPE location is identified in perfect synchronization with the available radio signal. At present, there are no available means to determine the CPE installation location accurately and existing solutions rely solely on Customer/Installation Personnel going around and trying to ascertain a best placement of CPE using a graphical user interface (GUI) on the CPE to determine the signal strength. This is extremely cumbersome, time consuming and results in lots of inaccuracy due to human intervention. Even after this exercise, it does not guarantee that the most suitable location was identified. The proposed arrangements will help to eradicate such inconsistencies and planning any new CPE location (including feasibility) can be very efficiently and accurately done.

The proposed model vastly reduces design complexity and challenges due to mmW propagation by identifying the most suitable CPE antenna location. A completely scalable design means that any increase in site count can be immediately used to identify improved building coverage, thereby translating to improved customer perceived experience. A high degree of reliability and accuracy in network design enables an optimal Return on Investment (RoI). This method is adaptable for any type of dwelling units such as single family units (SFU) or multi-dwelling unit (MDU).

Figure 2:
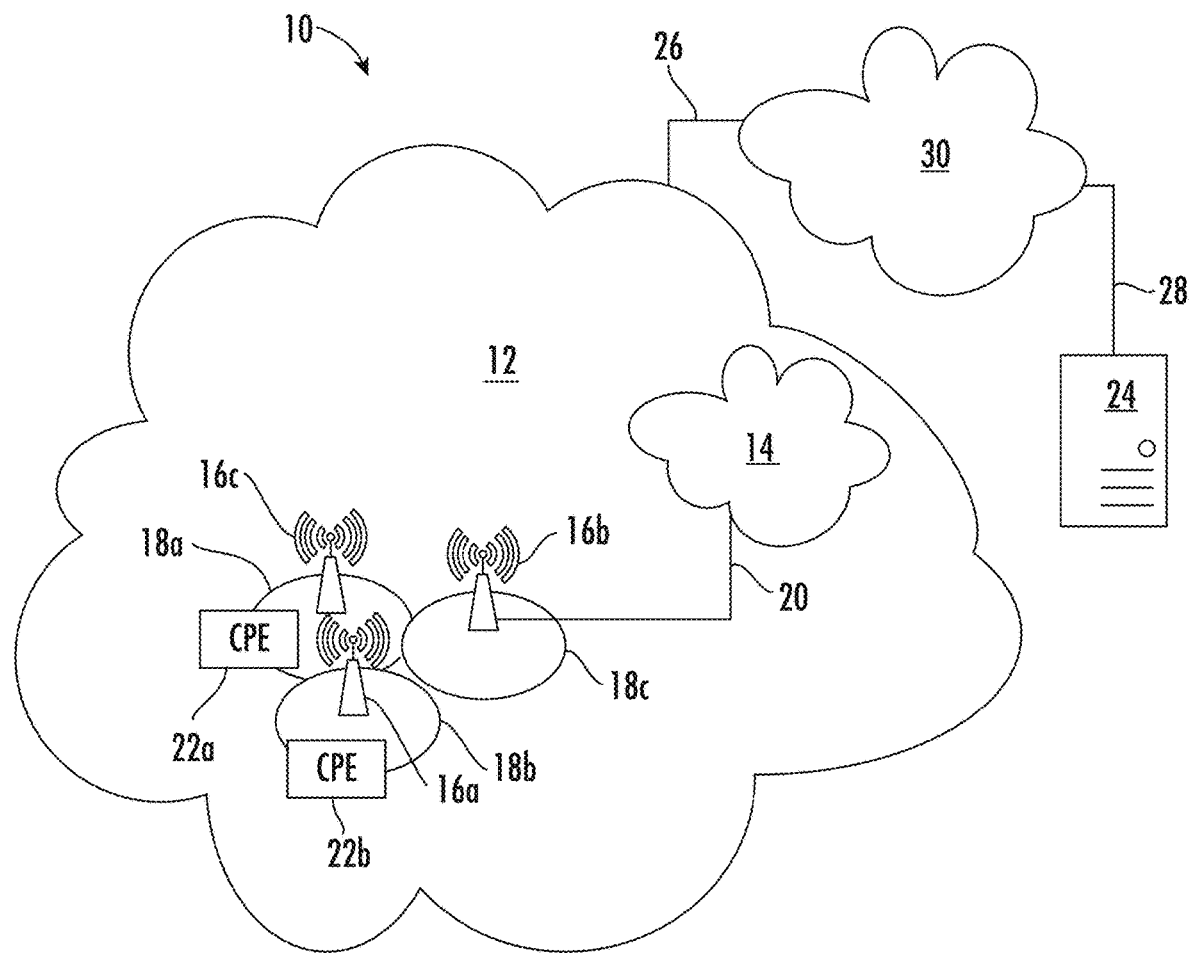
FIG. 2 is a block diagram of a communication system with base stations serving customer premises.

Returning to the drawing figures, in which like elements are referred to by like reference numerals, there is shown in FIG. 2 a schematic diagram of a communication system, according to an embodiment, including a communication system 10, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first customer premise equipment (CPE) 22a located in coverage area 18a is configured to wirelessly connect to, or be paged by, the corresponding network node 16c. A second CPE 22b in coverage area 18b is wirelessly connectable to the corresponding network node 16a. While a plurality of CPEs 22a, 22b (collectively referred to as customer premises equipment 22) are illustrated in this example, the disclosed embodiments are equally applicable to a situation where a sole CPE is in the coverage area or where a sole CPE is connecting to the corresponding network node 16. Note that although only two CPEs 22 and three network nodes 16 are shown for convenience, the communication system may include many more CPEs 22 and network nodes 16.

Also, it is contemplated that a CPE 22 can be in simultaneous communication and/or configured to separately communicate with more than one network node 16 and more than one type of network node 16. For example, a CPE 22 can have dual connectivity with a network node 16 that supports LTE and the same or a different network node 16 that supports NR. As an example, CPE 22 can be in communication with an eNB for Long Term Evolution/Universal Terrestrial Radio Access Network (LTE/E-UTRAN) and a gNB for NR/Next Generation Radio Access Network (NG-RAN).

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

Figure 3:
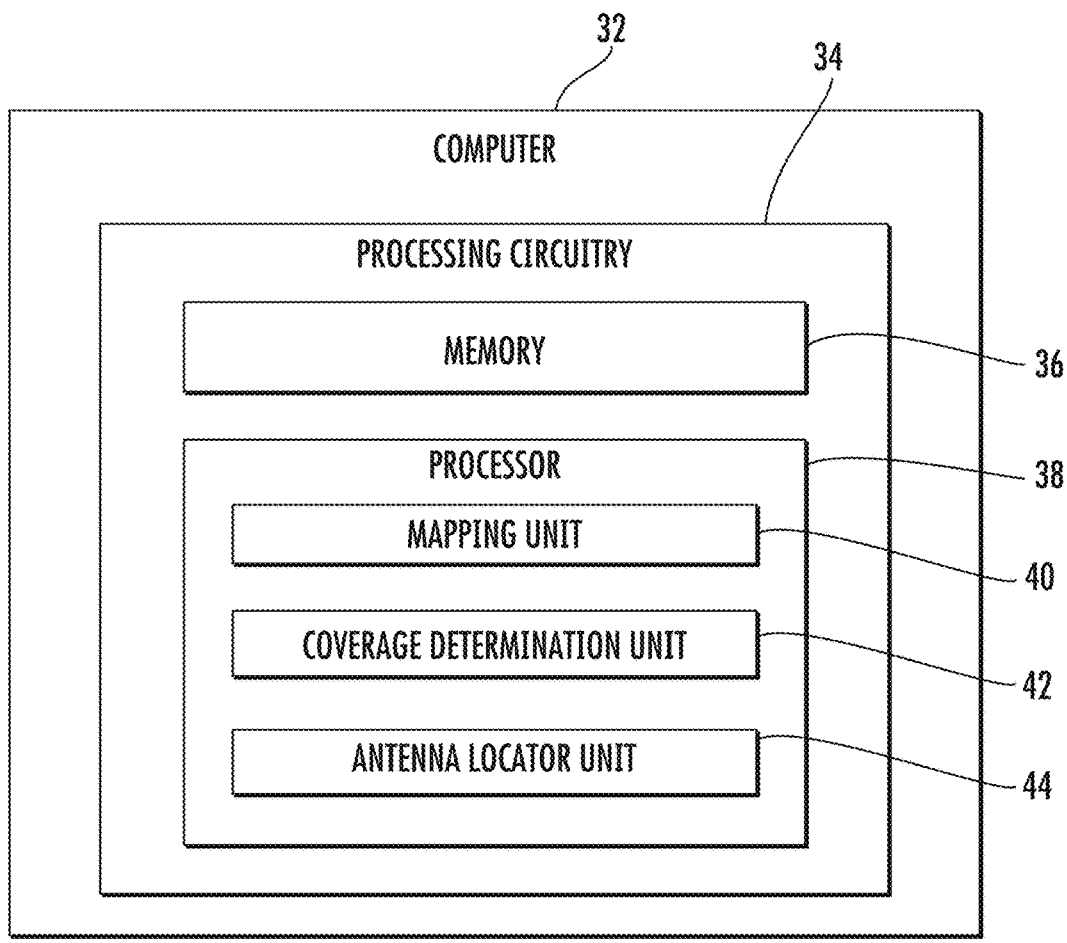
FIG. 3 is a block diagram of a computer for determining antenna locations for CPE according to principles set forth herein.

FIG. 3 is a block diagram of a computer 32 for determining antenna locations for CPE according to principles set forth herein. The computer 32 includes processing circuitry 34 which includes a memory 36 and a processor 38. The processor 38 is configured to implement functions of a mapping unit 40 as described herein that is configured to generate a map of signal strength for each of a plurality of possible antenna locations among one or more buildings. The processor 38 is also configured to implement functions of a building coverage determination unit 42 configured to identify a percentage of a building having a level of wireless network coverage. The processor 38 is also configured to implement functions of an antenna locator unit 44 as described herein that is configured to identify a location of an antenna based on the map of signal strength and the identified percentage.

Figure 4:
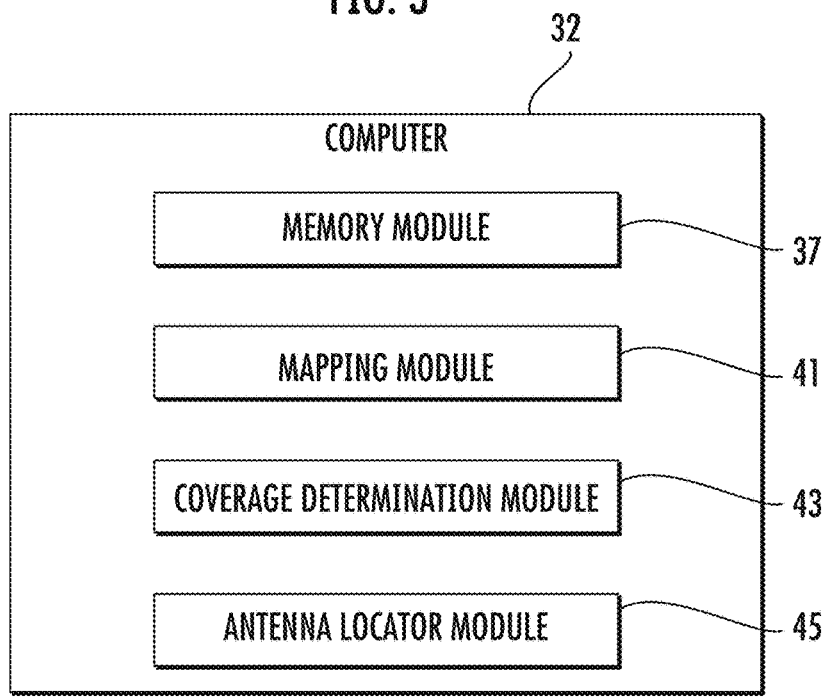
FIG. 4 is a block diagram of an alternative embodiment of a computer for determining antenna locations for CPE according to principles set forth herein.

FIG. 4 is a block diagram of an alternative embodiment of a computer for determining antenna locations for CPE according to principles set forth herein. The computer 32 has a memory module 37, a mapping module 41, a coverage determination module 43 and an antenna locator module 45. These modules may be implemented as software modules having computer code that when executed by a processor perform the functions described above with respect to FIG. 3.

Figure 5:
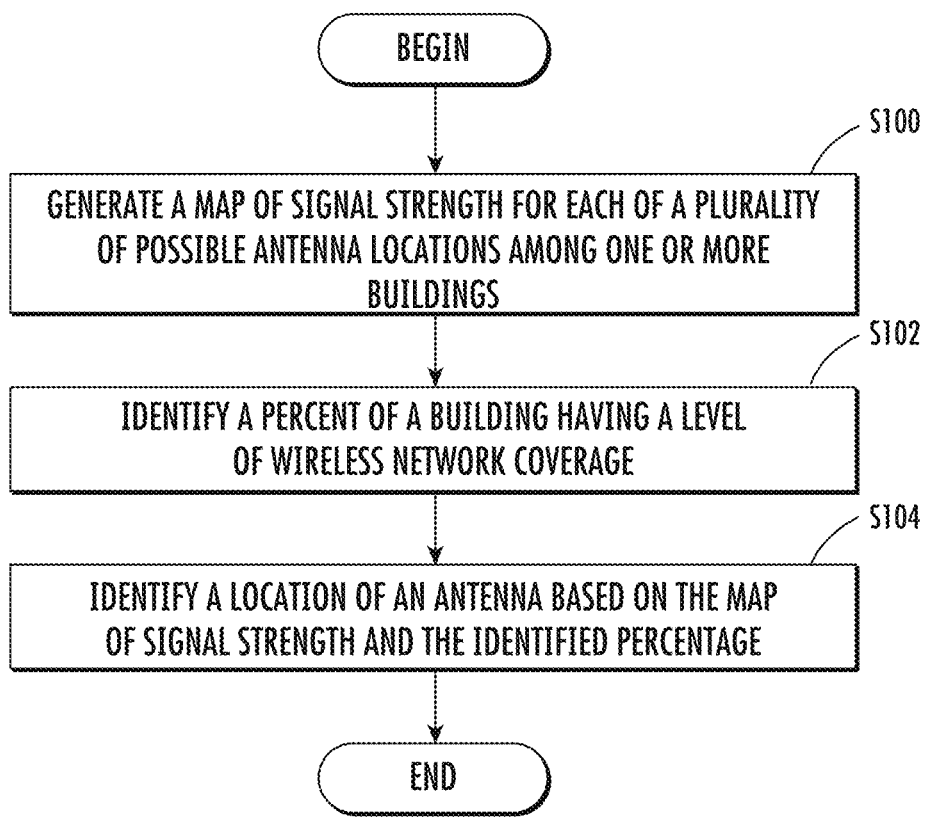
FIG. 5 is a flowchart of an exemplary processor determining antenna locations for CPE according to principles set forth herein.

FIG. 5 is a flowchart of an exemplary process for determining antenna locations for CPE according to principles set forth herein. The process includes generating, via the mapping unit 40, a map of signal strength for each of a plurality of possible antenna locations among one or more buildings (block S100). The process also includes identifying, via the coverage determination unit 42, a percentage of a building having a level of wireless network coverage (block S102). The process further includes identifying, via the antenna locator unit 44, a location of an antenna based on the map of signal strength and the identified percentage (block S104). In some embodiments, the level of wireless network coverage is one of a downlink throughput threshold and a signal to interference plus noise ratio, SINR, threshold. In some embodiments, the identifying of a percentage of a building having a level of wireless network coverage includes estimating segments of the building which receive wireless network coverage. In some embodiments, the identifying of a percentage of a building having a level of wireless network coverage includes calculating a ratio of a length of covered segments to a perimeter of the building. In some embodiments, the process further includes classifying a building as one of a single dwelling and a multiple dwelling, the identification of the location of an antenna being affected by whether the building is one of a single dwelling and a multiple dwelling. In some embodiments, when a building is classified as a multiple dwelling, the process includes calculating a number of floors of the building and a number of dwellings per floor, the identification of the location of an antenna being affected by a number of floors of the building.

Figure 6:
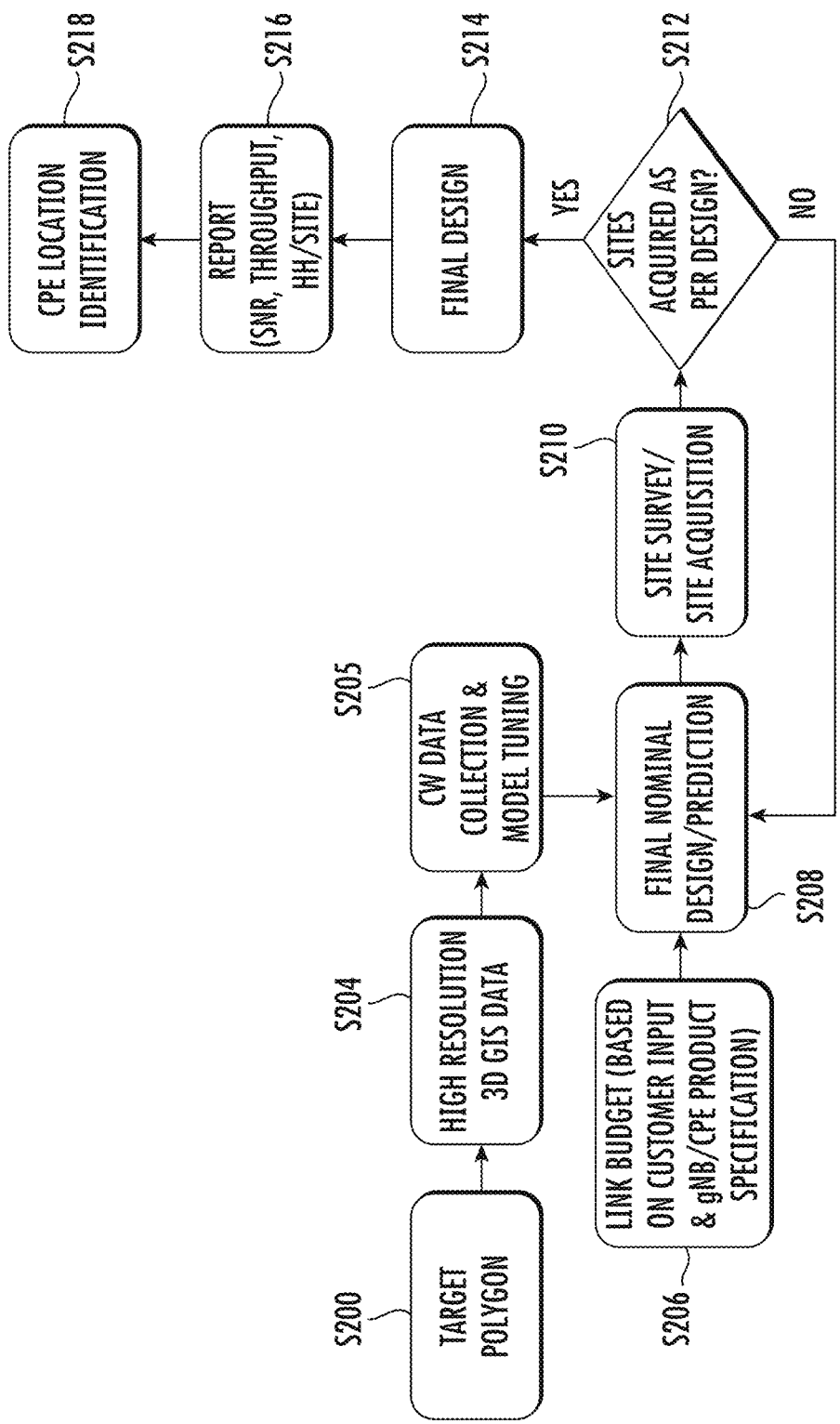
FIG. 6 illustrates a 5G FWA planning flow.

Details regarding certain example embodiments for identifying locations for antenna placement are described below. FIG. 6 illustrates a 5G FWA planning flow which begins with identification, via the processing circuitry 34, of the market polygon/area of deployment (block S200) and ends with identification, via the antenna locator unit 44, of the most suitable CPE location for optimal performance (block S218). The intermediate steps include, via the processing circuitry 34: obtaining high resolution 3 dimensional geographical information systems (GIS) data (block S204), and performing link budget calculation based on customer inputs and product (e.g., base station (gNB) and CPE) specifications (block S206), propagation model tuning based on CW data collection (block S205), final nominal prediction (block S208) and site acquisition (block S210). If the site acquisition can be accomplished as per the design (block S212) then the final design outputs (e.g., SNR, Throughputs, Households/site) are determined, via the processing circuitry 34, (block S214) and reported (block S216). The last stage is to identify, via the antenna locator unit 42, the best possible CPE location for different household types (SFU, MDU) in order to provide optimal coverage (block S218). This may involve consideration of many dynamics. This disclosure introduces methods to automatically perform, via the processing circuitry 34, the following tasks:

1. Identify the correct dwelling unit type (SFUs and MDUs);
2. Identify the building segments covered by 5G coverage;
3. For MDUs, identify the total number of apartments in an MDU that can avail 5G coverage; and
4. Identify the most appropriate CPE antenna location for a given dwelling unit type.

A detailed example of the process is depicted in the flowcharts in FIGS. 7-10 and explained in detail below. The process starts with inputs from the Network Service Provider (referred to as the Customer) and may include the following inputs:

Area of intended coverage and planned coverage reliability;

Dwelling Units to be covered (e.g., % of Households to be covered), areas excluded from planning (like open areas, parks, water bodies, etc.);

Data volume/household/month for initial Capacity estimation;

Street Furniture database containing details of inventory like Poles, existing sites, etc.; and High resolution 3D geographical information systems (GIS) data, building and tree polygon.

Figure 7:
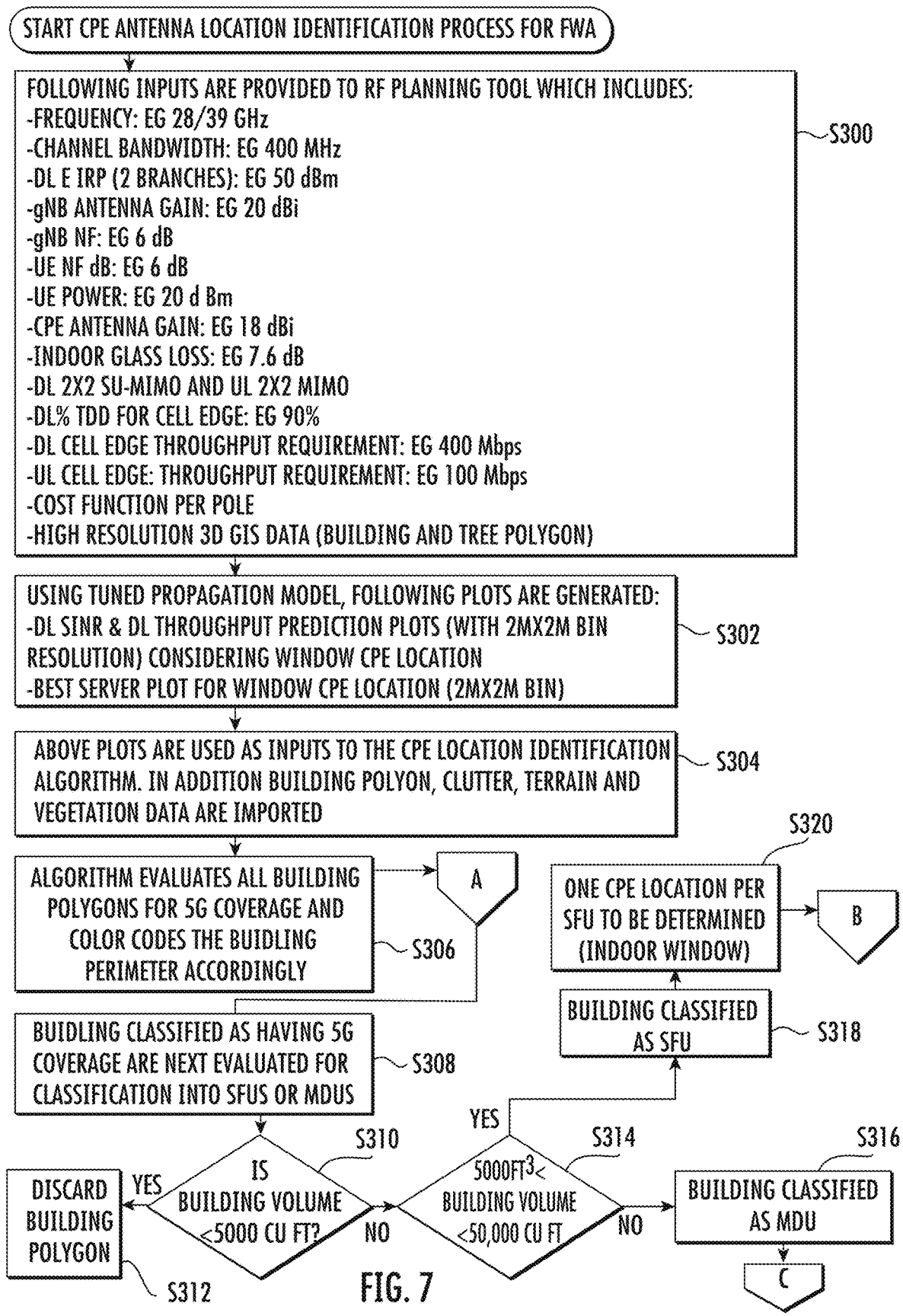
FIG. 7 is a flowchart of an exemplary process for planning and locating antenna sites for CPEs.

A more detailed explanation of the algorithms and processes performed by the processing circuitry 34 is now provided. In some embodiments, the processing circuitry 34 implements an RF planning tool and a CPE location identification algorithm for planning and determining locations of antennas. Referring to FIG. 7, inputs to an RF planning tool, as implemented by the processing circuitry 34, may be prepared based on the stages described above. A ray tracing model, implemented by the mapping unit 40, may be used for propagation model tuning. Also, high resolution digital maps (2m resolution) and building/tree polygon data may be provided. The following are examples of some of the inputs to the RF planning tool (block S300):

Frequency: e.g., 28 GHz/39 GHz (configurable);
Channel bandwidth: e.g., 400/800 MHz (configurable);
DL EIRP (Effective Isotropic Radiated Power) (2 branches), e.g., 50 dBm
Wireless device (WD) antenna gain;
gNBantenna gain;
gNB NF;
WD NF;
WD Max Tx Power;
CPE antenna gain;
Indoor glass loss/High loss, low loss;
DL 2×2 multiple input multiple output (MIMO) and UL 2×2 MIMO (configurable);
DL % TDD for cell edge: e.g., 90% (configurable);
DL Cell Edge Throughput Requirement (unloaded): e.g., 400 Mbps (configurable);
UL Cell Edge Throughput Requirement (unloaded): e.g., 100 Mbps (configurable);
Cost function per pole; and
high resolution 3D GIS data (building and tree polygon).

Figure 13:
FIG. 13 is an example of a throughput plot.

Based on the above inputs, the planning tool may generate the prediction results which, among other things, may include a reference signal received power (RSRP), signal to interference plus noise ratio (SINR). Using a tuned propagation model, throughput plots for uplink (UL) and downlink (DL) satisfying minimum coverage and capacity requirement for each distinct CPE location type in each household via rooftop, wall mount and indoor placement are output from the planning tool (mapping unit 40) (block S302). An example throughput plot is shown in FIG. 13, where different gray scales represent areas of different levels of RSRP or SINR. These plots may be generated with 2m×2m bin resolution for better intersection with building polygons. These layers may be inputs to a CPE location identification algorithm implemented by the processing circuitry 34 (block S304). In addition to these plots, building polygon, clutter, terrain and vegetation maps are also inputs to the CPE location identification algorithm. The algorithm evaluates building polygons for 5G coverage and color codes or shades the building perimeter accordingly (block S306). The steps of A are set forth in FIG. 8, discussed below.

Figure 9:
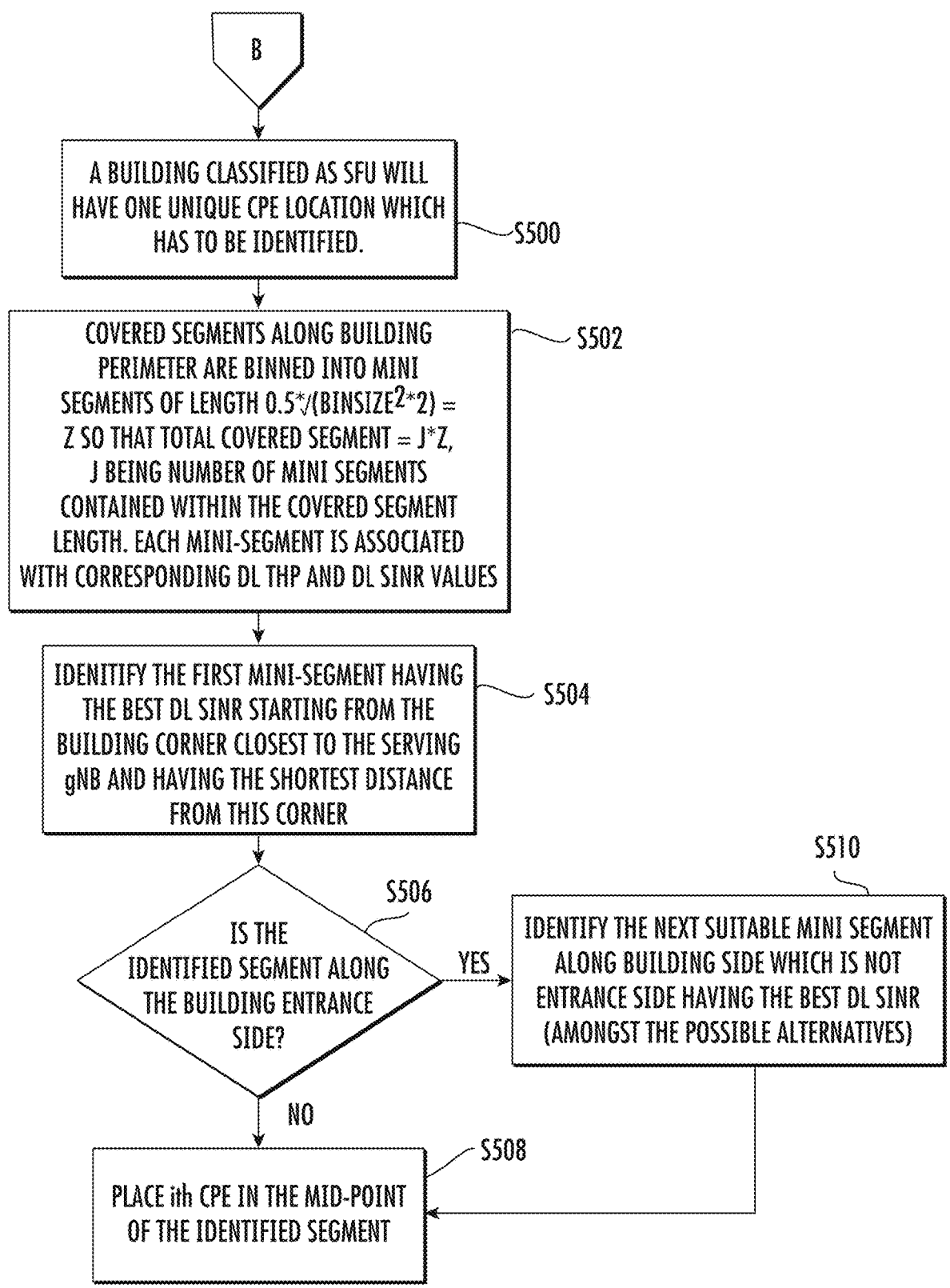
FIG. 9 is a continuation of the flowchart of FIG. 7 at connector B.
Figure 10:
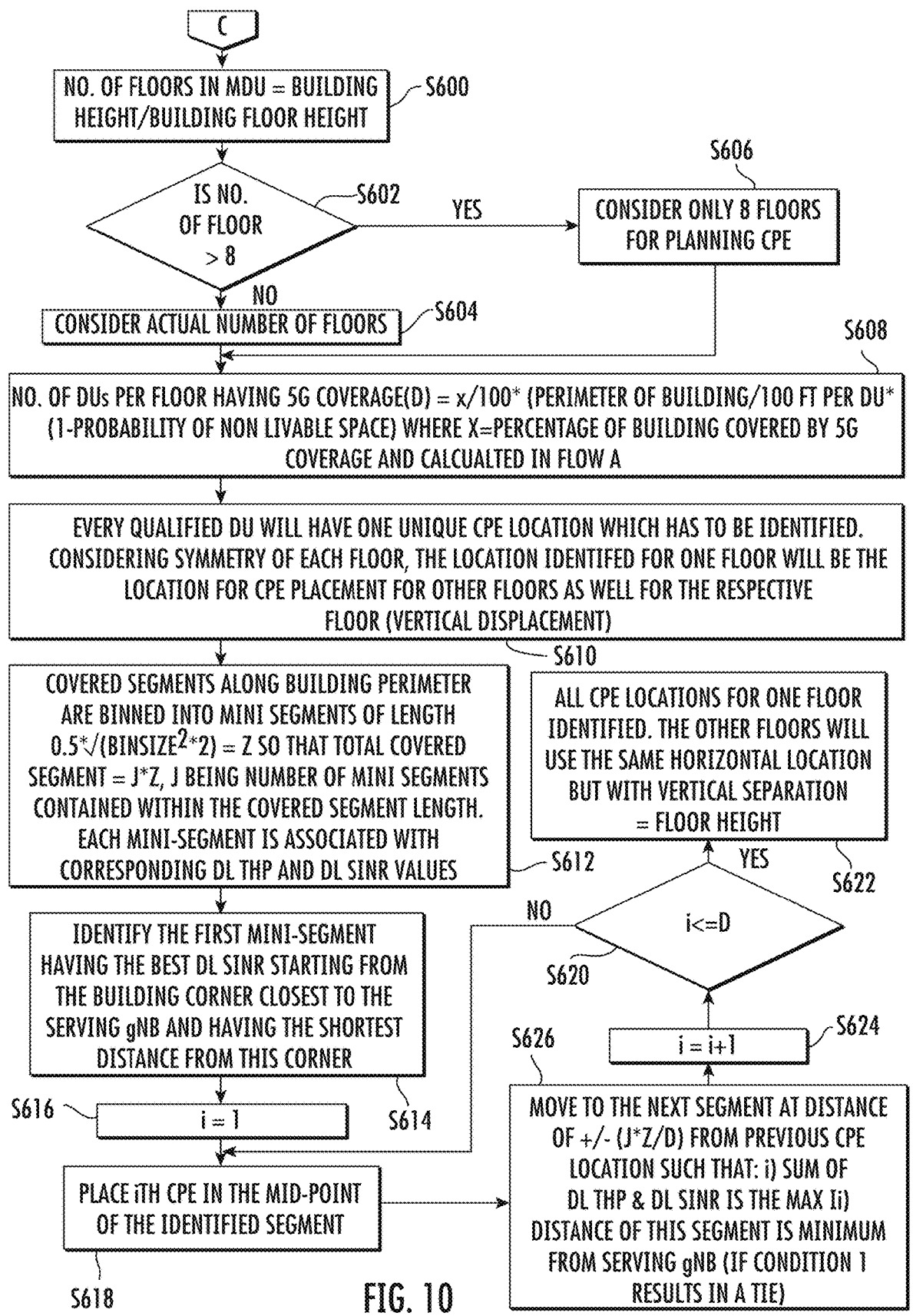
FIG. 10 is a continuation of the flowchart of FIG. 7 at connector C.

Once buildings are classified, via the coverage determination unit 42, as having desired coverage, such as 5G coverage, these buildings are next evaluated for classifications into SFUs or MDUs (block S308). If a building volume is less than 5000 cubic feet (block S310), as calculated by the processing circuitry 34, then the building polygon is discarded (block S312). Building volume may be calculated as building perimeter×building height and expressed in cubic feet. If the building volume is greater than 5000 cubic feet but less than 50,000 cubic feet (block S314), the building is classified as an SFU (block S318). Otherwise, the building is classified as an MDU (block S316) and the process proceeds as shown in FIG. 10. If the building is classified as an SFU (block S318), then one CPE location per SFU is determined (block S320). The process then proceeds as shown in FIG. 9. Thus, after completion of the building classification, only buildings of interest (for example, SFUs and MDUs) may be used by the algorithm to determine, via the antenna locator unit 44, the appropriate CPE location.

Figure 8:
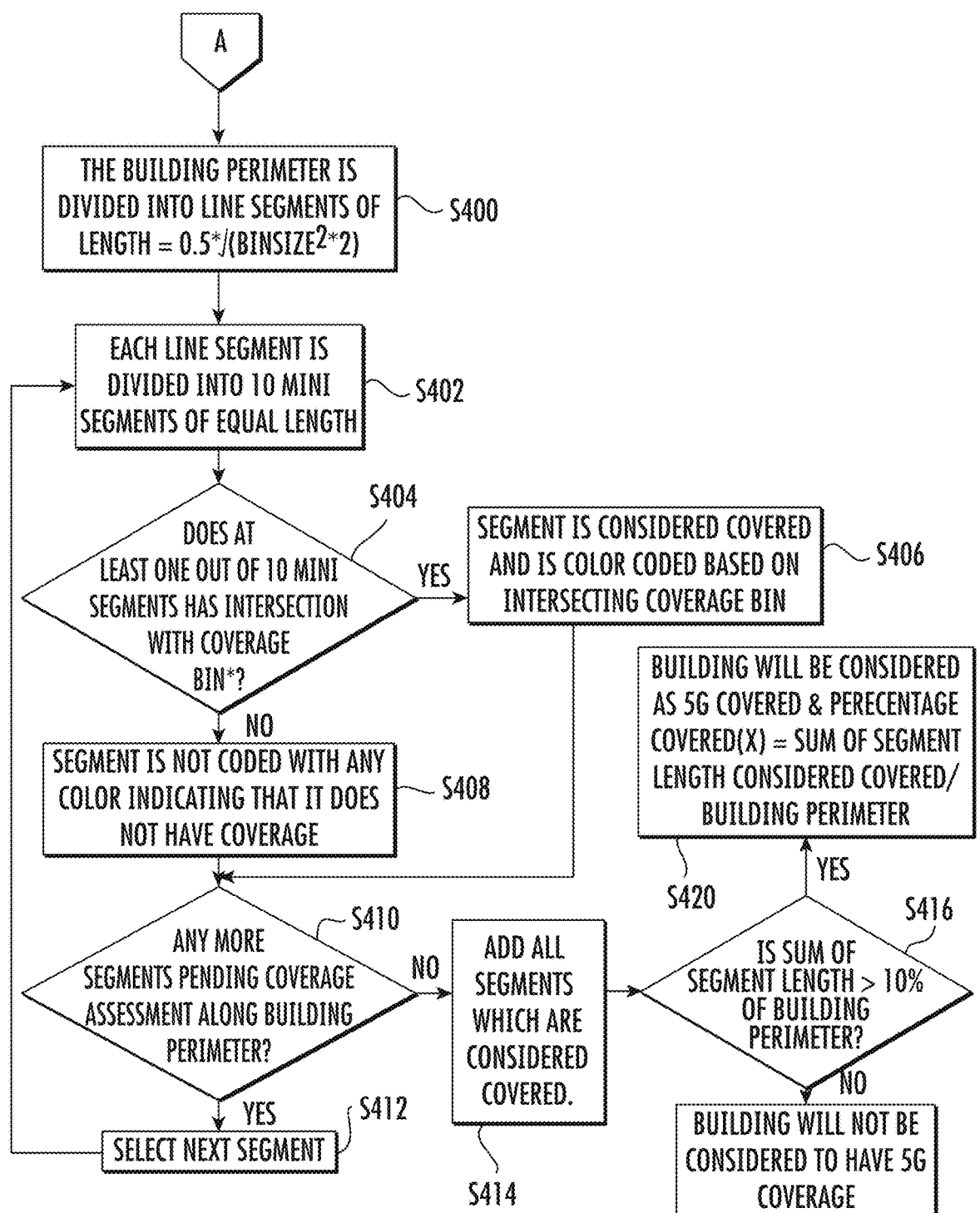
FIG. 8 is a continuation of the flowchart of FIG. 7 at connector A.

Referring to FIG. 8, a process implemented by the processing circuitry 34, which evaluates building polygons for 5G coverage and color codes or shades the building perimeter, is presented. This process is indicated by connector A from FIG. 7. The coverage patterns generated by the planning tool may be based on non-LOS communication and may not always result in homogenous coverage of all buildings within the serving area of a cell. As a result, it may be desirable to estimate the building segments/faces which are covered by 5G coverage using the building polygons and coverage plots generated by the planning tool. This may be performed using the following steps.

To calculate, via the coverage determination unit 42, the overlap of the building perimeter with coverage grids which are represented by square blocks having each edge of length binSize, the building perimeter may be divided into line segments of length calculated as a function of the binSize and represented as $$\text{Segment length}(S) = \frac{\sqrt{(2 \times binSize^2)}}{2}$$

Figure 14:
FIG. 14 is a high resolution plot that is an output of the planning tool.
Figure 16:
FIG. 16 is a plot of antenna placements.

(block S400). Each coverage bin may be represented typically by a 2m+2m square grid (binSize=2m) which can be coded, e.g., color coded or grey scaled, based on the average value of the metric (e.g. DL SINR/DL Throughput/etc.) it represents. In FIGS. 13, 14 and 16, intensity of RSRP or SINR, for example, is represented in gray scale. Generally, the darker the shading in these figures, the lower the value of the metric. Note that FIGS. 13, 14 and 16 are examples, only. However, it is understood that actual implementations can use color or other arrangements such as grey scale shading to distinguish one intensity level from another. A segment may be considered qualified when an intersecting coverage bin has DL Throughput>Target Throughput (for example 400 Mbps) or DL SINR>target value (for example 6 dB).

Each line segment S, may be divided, via the processing circuitry 34, into ten equal mini segments (block S402). A determination is made whether at least one out of 10 mini segments intersects with a coverage bin (block S404). Each coverage bin is represented by a 2m×2m square grid shading based on the average value of the metric it represents, using certain conventions, for instance, the darker the shading the lower the metric. A segment is considered qualified when an intersecting coverage bin has DL Throughput>400 Mbps and DL SINR>6 dB. If there is such intersection, the segment is considered covered and is shaded based on an intersecting coverage bin (block S406). The line segment S may also be shaded based on the metric represented by the intersecting coverage grid and its corresponding shade. If there is not at least one out of 10 mini segments that intersects with a coverage bin, then the segment is not coded with any shading, indicating that it does not have coverage and the line segment along the building perimeter may be marked as "not covered" (block S408). For intersection of multiple mini segments with multiple coverage grids, a segment may be shaded based on the average value of the metric represented by the intersecting grids. If there are any more segments pending coverage assessment along the building perimeter (block S410), the process continues at block S412). Otherwise, all line segments which are marked as "covered" may be added, which is represented by a measure C given by $$C = \Sigma S_c$$

(block S414).

If P=perimeter of building, then the building may be considered to have 5G coverage and percentage covered equals sum of segment length considered covered/building perimeter (block S420) if the ratio $$\frac{C}{P} > 0.1$$

Figure 15:
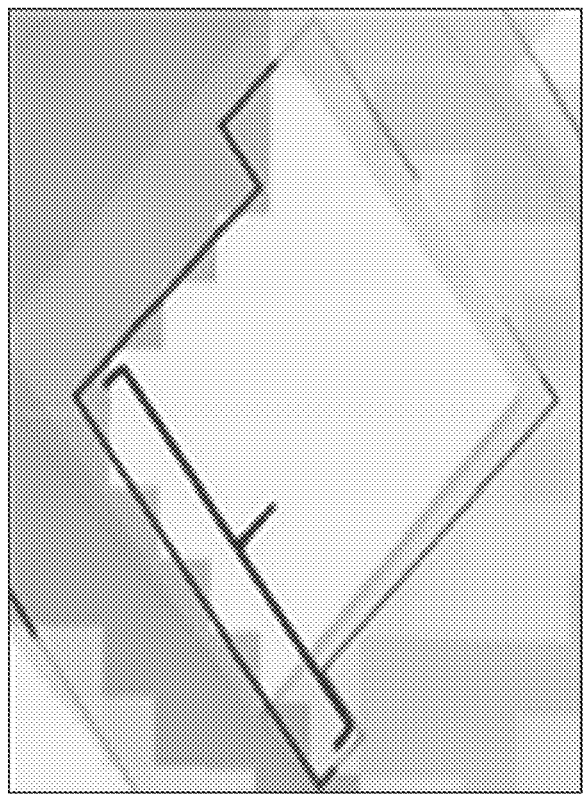
FIG. 15 is a diagram of a plot identifying segments of a perimeter of a building.

(block 8416). Otherwise, the building will not be considered to have 5G coverage (block S418). This ratio (C/P) x, denotes the portion of the perimeter of the building considered to be covered. This ratio may be used in the subsequent parts of the algorithm for determining the number of dwelling units in an MDU which are considered covered. See FIG. 15.

Referring to FIG. 9, a flowchart of a process for determining a CPE location for an SFU is shown. This process is indicated by connector B from FIG. 7. A building classified as an SFU may have one unique CPE location which may be identified (block S500). Note that in this disclosure, only a window location for CPE antenna placement has been used as that may be a preferred option owing to ease as well as lower cost of installation. The necessary losses have been modelled in the planning tool while running the predictions and subsequently used to calculate, via the coverage determination unit 42, the building coverage probability as described above. The building segments which were identified to be covered and shaded accordingly in the previous steps may be binned into mini segments having length $$z = \sqrt{(2 \times \llbracket binSiz \rrbracket ^\wedge 2)}$$

The total covered segment length of the SFU can be represented as j×z, where j represents the number of mini segments contained within the covered segment length. Each of the mini segments may be associated with DL SINR or DL THP throughput values based on the segment from which it has been derived (block S502).

The process of FIG. 9 further includes identifying the first mini segment out of j segments having the best DL SINR starting from the building corner having the least aerial distance from the best server for that building (block S504). If the identified segment is not on the building entrance face (block S506), the midpoint of the mini segment may be identified as the appropriate CPE antenna placement location (block S508). If the segment identified is along the building front face, the next best segment may be chosen and the process is repeated (block S510). If no appropriate segment is available along the building perimeter other than the building front face, then the initially identified segment having the best DL SINR may be finalized (block S508).

FIG. 10 is a process that addresses the situation where the building is determined to be an MDU. MDUs typically have multiple floors and multiple dwelling units per floor. This process is indicated by connector C from FIG. 7. Hence, to identify the CPE antenna location, the following may be determined:

Number of floors in the MDU;

Number of dwelling units (DUs) per floor; and

Unique location per DU for placement of CPE antenna.

Building Floor Height ($h_{BF}$);

For MDUs estimated to have more than 8 floors, the number of floors may be capped to 8 for design consideration, for example. This implies that floors above $8^{th}$ floor will not be considered for FWA availability while a design will accommodate up to 8 floors for planning. This is done taking into consideration the average pole height and mmW propagation model along with the following assumptions.

100 ft. is considered to be the average run length along building perimeter for a given MDU (other average run lengths can be considered as well);

Probability of non-livable space (p) is an empirical function of the building volume; and Floors of an MDU are completely symmetric implying the layout of each floor is the same.

Using the above hypotheses, one or more of the following steps may be used, via the antenna locator unit 44, to determine the CPE location for each MDU:

Determine the number of floors in MDU using the equation $$1. \ N_f = \frac{\text{height of building}}{h_{BF}};$$

If $N_f > 8$, then the number of floors of the MDU considered for planning is capped to 8 floors. Otherwise, consider $N_f$ for planning.

Thus, in FIG. 10, the number of floors of the MDU is calculated by dividing the building height by the building floor height (block S600). If the number of floors is calculated to be not greater than 8 (block S602) then the actual calculated number of floors is used in subsequent process steps (block S604). Otherwise, only 8 floors are considered in subsequent process steps in the flowchart of FIG. 10 (block S606).

The next steps, implemented by the processing circuitry 34, involve the following: Calculate the number of DUs per floor as $$D = x \times \frac{\text{Perimeter of Building(in ft)}}{100 \text{ ft}} \times (1 - \rho);$$

where x is calculated above and denotes the percentage perimeter of the building considered as covered (block S608);

Every qualified DU (i.e., DUs having 5G coverage identified from the above step) may have one CPE antenna location. Considering symmetry of the floor layout, other floors may have the same CPE location in the horizontal plane, but differ in the vertical plane (i.e., belong to the corresponding floor) (block S610);

The building segments which were identified to be covered and color coded or shaded accordingly in the previous steps may be binned into mini segments having length $$Z = \frac{\sqrt{2 \times binSize^2}}{2}$$

The total covered segment length of the SFU can be represented as j×z, where j represents the number of mini segments contained within the covered segment length. Each of the mini segment may be associated with DL SINR or DL throughput values based on the segment from which it has been derived (block S612);

Identify the first mini segment out of j segments having the best DL SINR starting from the building corner having the least aerial distance from the best server for that building. The midpoint of the mini segment may be identified as the appropriate CPE antenna placement location for the first CPE out of D (block S614);

Subsequent steps are performed starting from i=1 (block S616) and the $i^{th}$ CPE is placed in the midpoint of the identified segment (block S618)

Move to the next segment at distance of ±(j×z)/D from previous CPE location (block S626), such that:

a sum of DL Throughput or DL SINR for the corresponding segment is the maximum;

distance of this segment is minimum from serving gNB (if condition 1 results in a tie);

The identified position becomes the next CPE location. The process is repeated until all the CPE locations have been uniquely identified and placed for a given floor; and The index i is incremented (block S624), and if i is still less than the maximum number of dwelling units (DUs), (block S620), then the process continues at block S618.

Otherwise, the other floors will use the same horizontal locations but with vertical separation (block S622). Thus, as per the hypothesis, building symmetry may allow the same locations for CPE antennae placement for all relevant floors considered in the design. This completes placement of CPE antennas for all covered households in an MDU. See FIG. 16.

Figure 11:
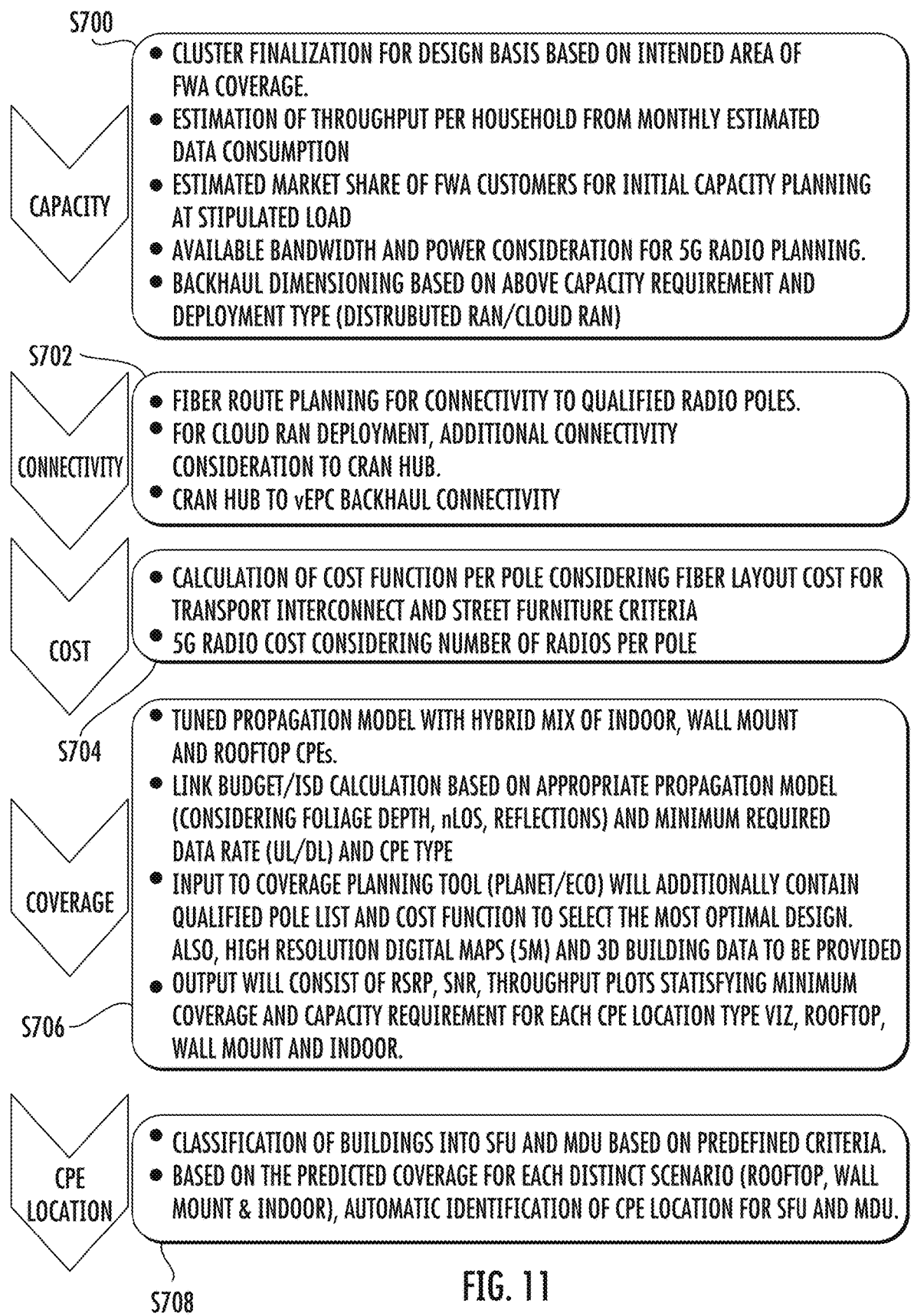
FIG. 11 illustrates five broad categories of antenna location planning process.

As shown in FIG. 11, the planning process can be classified under the five broad categories, also referred to here as the 5Cs of 5G FWA designing: Capacity (block S700), Connectivity (block S702), Cost (block S704), Coverage (block S706) and CPE Location (block S708). At least some of these steps can be performed by computer 32 as described above.

Cluster Finalization for Design Basis Based on Intended Area of FWA Coverage

Figure 12:
FIG. 12 is a map identifying a target area.

Based on the inputs received from the customer regarding the target area of coverage, a polygon may be created to identify the area on a map, an example of which is shown in FIG. 12. In addition, the 3D building data, high resolution digital maps of clutter and terrain, street furniture, such as street lights, data obtained from the customer may also be used.

Estimation of Throughput per household from monthly estimated data consumption

Table 1 shows examples of some typical Third Generation Partnership Project (3GPP) deployment scenarios from a 5G RAN Plenary meeting (held in March 2016). For carrying out Capacity estimation, Urban Macro is considered as an example.

TABLE 1

| S.NO | Clutter | ISO | Antennna Height | Carrier Frequency | Bandwidth |
|---|---|---|---|---|---|
| 1 | Indoor Hotspot | 20 m | 3 m | 4 GHz | 200 MHz |
|   |   |   |   | 30 Ghz | 1 GHz |
|   |   |   |   | 7 GHz |   |
| 2 | Dense Urban | 200 m | Macro = 25 m | 4 Ghz | 200 MHz |
|   |   |   | Micro = 10 m | 30 Ghz | 1 GHz |
|   |   |   | (3 Micro cells per Macro cells) | 7 Ghz |   |
| 3 | Urban Macro | 500 m | 35 m | 4 Ghz | 200 MHz |
|   |   |   |   | 2 Ghz | 100 MHz |
|   |   |   |   | 30 MHz |   |
| 4 | Rural | 5000 m | 35 m | 700 Ghz | 20 MHz |
|   |   |   |   | 4 Ghz | Under Planning |
|   |   |   |   | 2 Ghz |   |

For illustrating the concept of Capacity and Coverage planning, some hypothetical assumptions may be made with respect to the data usage per household and typical Inter site distance (ISD). In this case, it is assumed that each household may have on average 1000 GB of data usage per month, and typically, the ISD will be 500m. These inputs may be used to calculate the minimum throughput requirement per 5G Node as shown below in Table 2.

TABLE 2

| GB Data/Month | Data Volume in Kb/month | Data Volume/Day | Throughput in Kbps (Non Busy Hour) | Throughput in Kbps (Busy Hour) | SFU per Site | Average DL Site Throughput (Mbps) |
|---|---|---|---|---|---|---|
| 1000 | 8388608000 | 279620266.7 | 3236.345679 | 7767.22963 | 54 | 419.4304 |

The above values have been calculated based on certain assumptions which are listed below:

Busy hour throughput requirement per node which is calculated considering 10% of a whole day's traffic per household is carried during each Busy Hour. From the above table, this would result in busy hour data volume of 279620266.7/10=27962026.67 kB and a throughput requirement of 279620266.67/3600=7.77 Mbps per SFU.

With an average ISD of 500m per node, average house density of 1000 houses/sq. kilometer (km) and an estimated market share of 25%, approximately 54 houses will be served by each planned gNB. This would result in per site minimum average throughput requirement of (7.77*54)=419 Mbps.

Estimated Market Share of FWA Customers for Initial Capacity Planning at Stipulated Load The market share of the customer can be used as an estimate to calculate initial capacity requirement. The throughput required per site may be dependent on the number of dwelling units being covered by each site, using a suitable ISD for the given clutter type.

Available bandwidth and power consideration for 5G radio planning

The following inputs are examples of what may be provided by the customer based on the respective band allocation:

Frequency: e.g. 28 or 39 GHz (configurable);
Channel bandwidth: e.g. 400 or 800 MHz (configurable);
Downlink (DL) effective isotropic radiated power (EIRP), e.g., 56 or 60 dBm (configurable);
% of area coverage; and
DL/UL time division duplex (TDD) ratio.

This step deals with simulation of radio coverage for covering the CPE locations in a target polygon area using wireless access. Coverage is typically calculated for the three major CPE deployment scenarios: window, outdoor wall mount and rooftop, though in this disclosure, window installation of CPE location is considered since that is the primary location of choice for any given household. In practice, a hybrid mix of antenna locations will likely be used.

Indoor (Window): Indoor/Window may have the highest propagation loss, but may be preferable due to ease of installation since it can be self-installed by the subscriber. Also, this may be the most suitable option for multiple dwelling units (MDUs). The indoor CPE location may be preferred near windows to increase the probability of getting a clear LOS with the transmitting base station (gNB) ensuring the height of the CPE antenna from ground to be at least 1.5m.

Before starting the alignment for CPE remote radio head (RRH) with a gNB, it may be ensured that the location of the CPE location has the best possible signal strength. Factors affecting signal strength like trees, house, buildings etc., impose additional challenges on achieving proper directivity for achieving a best received signal strength.

Outdoor Wall Mount: Wall Mount installations are done on the exterior wall of the house, typically 2.5m above the ground to reduce the radio frequency (RF) signal degradation by eliminating the loss from the structure. An outdoor installation of the CPE will increase the gNB selection options since it is no longer constrained by the building penetration losses and lower height.

Points of considerations when wall mount installation is performed may include:

Identification of points where achieved signal strength is good;
Utilize existing wall conduits for CPE installation to reduce associated cost; and
Installation near close proximity to trees, buildings, etc. should be avoided.

Outdoor Roof Top: Roof Top CPE installation may be the most lucrative from a radio planning perspective as it encounters least foliage/obstruction losses, may have a best probability of LoS communication and no in-building losses during reception of radio signals. However, this may be the least preferred option from a customer's standpoint as the installation may need to be done by trained personnel, resulting in significant cost.

As described above, the output of the planning tool consists of high resolution plots of different RF metrics such as DL throughput, SINR for each distinct CPE location (like Window, Wall mount and Rooftop) as shown in FIG. 14. FIG. 14 is shown in grey scale where, the darker the shading, the lower the metric.

The method discussed above with respect to FIGS. 7-10 estimates the building coverage probability based on the imported plots and accordingly identifies the most suitable CPE antenna location based on the type of dwelling units (SFUs or MDUs). In order to do that, the algorithm may perform the following steps:

Classify the buildings into SFUs and MDUs. One SFU may have a single CPE antenna while one MDU may have multiple CPE antennae based on the number of households covered;
Identify the percentage of the building having acceptable 5G coverage which forms the basis for identifying the most appropriate CPE location;
Identify the optimal location for CPE antenna placement for SFU (single antenna per SFU); and
Identify the optimal locations for CPE antennae placement for MDU (multiple antennae per floor corresponding to multiple dwelling units).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 5G | Fifth Generation |
| BBU | Baseband Unit |
| CPE | Customer Premises Equipment |
| CPRI | Common Public Radio Interface |
| DL | Downlink |
| C-RAN | Centralized Radio Access Network |
| eCPRI | Evolved - Common Public Radio Interface |
| E-RAN | Enhanced - Radio Access Network |
| FWA | Fixed Wireless Access |
| FTTx | Fiber to x (where X can be Home/Pole etc.) |
| gNB | Next generation NodeB |
| ISD | Inter Site Distance |
| LiDAR | Light Detection and Ranging |
| LOS | Line of Sight |
| MBB | Mobile Broadband |
| MME | Mobility Management Entity |
| nLOS | Non-Line of Sight |
| NR | New Radio |
| NTP | Network Terminal Point |

-continued

| Abbreviation | Explanation |
| --- | --- |
| RRH | Remote Radio Head |
| RSRP | Reference Signal Received Power |
| SFU | Single Family Unit |
| SINR | Signal to Interference plus Noise Ratio |
| UHD | Ultra High Definition |
| UL | Uplink |
| vEPC | Virtual Evolved Packet Core |
| vLOS | Vegetation Line of Sight |
| WRC | World Radiocommunication Conference |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for determining placement of at least one antenna of customer premises equipment in a fixed wireless access network, the method comprising:
  generating a map of signal strength for each of a plurality of possible antenna locations among one or more buildings;
  identifying a percentage of a building having a level of wireless network coverage, the identifying including calculating a ratio of a length of covered segments to a perimeter of the building; and
  determining a placement of antenna locations based at least in part on the map of signal strength and the identified percentage such that a distribution of antennas among dwellings of one floor of the building determines a distribution of antennas on at least one other floor of the building.

2. The method of claim 1, wherein the level of wireless network coverage is one of a downlink throughput threshold and a signal to interference plus noise ratio, SINR, threshold.

3. The method of claim 1, wherein the identifying of a percentage of a building having a level of wireless network coverage includes estimating segments of the building which receive wireless network coverage.

4. The method of claim 1, further comprising classifying a building as one of a single dwelling and a multiple dwelling, the determining of the location of an antenna for placement being affected by whether the building is one of the single dwelling and the multiple dwelling.

5. The method of claim 4, further comprising, when a building is classified as a multiple dwelling, calculating a number of floors of the building and a number of dwellings per floor, the determining of the location of an antenna for placement being affected by a number of floors of the building.

6. The method of claim 5, wherein a number of dwellings is derived based on a perimeter of the building and a probability of non-livable space within the building.

7. A computer for determining placement of at least one antenna of customer premises equipment in a fixed wireless access network, the computer comprising:
  processing circuitry configured to:
    generate a map of signal strength for each of a plurality of possible antenna locations among one or more buildings;

identify a percentage of a building having a level of wireless network coverage, the identifying including calculating a ratio of a length of covered segments to a perimeter of the building; and determine a placement of antenna locations based at least in part on the map of signal strength and the identified percentage such that a distribution of antennas among dwellings of one floor of the building determines a distribution of antennas on at least one other floor of the building.

8. The computer of claim 7, wherein the level of wireless network coverage is one of a downlink throughput threshold and a signal to interference plus noise ratio, SINR, threshold.

9. The computer of claim 7, wherein the identifying of a percentage of a building having a level of wireless network coverage includes estimating segments of the building which receive wireless network coverage.

10. The computer of claim 7, further comprising classifying a building as one of a single dwelling and a multiple dwelling, the determining of the location of an antenna for placement being affected by whether the building is one of a single dwelling and a multiple dwelling.

11. The computer of claim 10, wherein when a building is classified as a multiple dwelling, calculating a number of floors of the building and a number of dwellings per floor, the determining of the location of an antenna for placement being affected by a number of floors of the building.

12. The computer of claim 11, wherein a number of dwellings is derived based on a perimeter of the building and a probability of non-livable space within the building.

13. A method for determining placement of at least one antenna of customer premises equipment in a fixed wireless access network, the method comprising:

generating a map of signal strength for each of a plurality of possible antenna locations among one or more buildings;

identifying a percentage of a building having a level of wireless network coverage, the level of wireless network coverage being one of a downlink throughput threshold and a signal to interference plus noise ratio, SINR, threshold, the identifying of a percentage of a building having a level of wireless network coverage including:
  estimating segments of the building which receive wireless network coverage; and
  calculating a ratio of a length of the covered segments to a perimeter of the building; and determining a placement of antenna locations based at least in part on the map of signal strength and the identified percentage such that a distribution of antennas among dwellings of one floor of the building determines a distribution of antennas on at least one other floor of the building.

14. The method of claim 13, further comprising classifying a building as one of a single dwelling and a multiple dwelling, the determining of the location of an antenna for placement being affected by whether the building is one of a single dwelling and a multiple dwelling.

15. The method of claim 13, further comprising using a tuned propagation model to generate a throughput plot for downlink and uplink signaling that satisfies a minimum coverage requirement for each distinct antenna placement, the throughput plot being generated with a bin resolution on an order of meters.

* * * * *